Patented July 29, 1952

2,605,266

UNITED STATES PATENT OFFICE 2,605,266

PYRROLIDYL-ALKYL ESTERS OF PARA-PROPOXYBENZOIC ACIDS

William Bradley Reid, Jr., Kalamazoo, Mich., assignor to The Upjohn Company, Kalamazoo, Mich., a corporation of Michigan No Drawing. Application May 5, 1949, Serial No. 91,624

11 Claims. (Cl. 260—326.3)

This invention relates to 1-pyrrolidyl and 1-(alkyl-pyrrolidyl) alkanol esters of a para-propoxybenzoic acid, and their acid addition salts.

The esters of this invention have the formula:

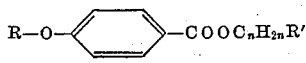

wherein R is a member of the group consisting of normal and isopropyl radicals, R' is a member of the group consisting of pyrrolidyl-1 and lower-alkyl-substituted pyrrolidyl-1 radicals, and $n$ is an integer from 2 to 5, inclusive.

The esters of the invention are high boiling liquids which are readily soluble in most of the common organic solvents but insoluble in water. The acid addition salts, such as the hydrochloride, hydrobromide, sulfate, nitrate, acetate, tartrate, and citrate are generally crystalline solids with well defined melting points and are readily soluble in cold water, methanol, or ethanol, moderately soluble in isopropanol, ethyl acetate, or methyl-ethyl ketone, and insoluble in the comon aliphatic, cycloaliphatic and aromatic hydrocarbon solvents.

Members of this new group of compounds have been prepared and found to have value as local anesthetics, being active both subcutaneously and topically without irritation. The freedom from irritation is unexpected, since beta-(pyrrolidyl-1)-ethyl para-n-butoxybenzoate, a homologue of one of the compounds of this invention, was found to be so irritating as to render it unfit for anesthetic use.

The free basic esters of the invention can be prepared readily by reacting an acid chloride having the formula:

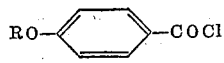

with a pyrrolidyl-alkanol having the formula:

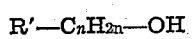

wherein R, R' and $n$ have the values given previously. The corresponding acid bromides can also be used, if desired, although the method of preparing the compounds of this invention will be described with particular reference to the acid chlorides. The acid chlorides can be prepared readily and in excellent yield by treating the corresponding acid with thionyl chloride for a period of from one to several hours. The reaction can be conveniently carried out at the refluxing temperature of the mixture. An excess of thionyl chloride is usually employed and the excess subsequently removed by distillation under reduced pressure leaving the acid chloride as a residue which is generally sufficiently pure for use without further purification, but which can be fractionally distilled to obtain greater purity, if desired. Acid bromides can be prepared in a similar manner using thionyl bromide.

The pyrrolidyl alkanols used in preparing the esters of the present invention can be prepared conveniently in several ways. Thus, a suitable haloalkanol may be reacted with pyrrolidine or with an alkyl pyrrolidine and the desired alkanol obtained. In certain instances, it is advantageous to first condense pyrrolidine or an alkyl pyrrolidine with a suitable halo-ketone, an ester of a suitable saturated halo-aliphatic acid, or an ester of a suitable alpha beta unsaturated aliphatic acid to form a pyrrolidyl ketone or an ester of a pyrrolidyl aliphatic acid. In other instances, it may be of advantage to condense a suitable amino alcohol with a succinic acid to form an N-hydroxy-alkyl succinimide or with a suitable gamma keto acid to form an N-hydroxy-alkyl pyrrolidone. These ketones or esters are then reacted with lithium aluminum hydride in absolute ether to produce the desired pyrrolidyl and lower-alkyl-substituted pyrrolidyl alkanols. Other pyrrolidyl alkanols may be prepared by condensing a suitable pyrrolidine with formaldehyde and a suitable aliphatic aldehyde to give an N-pyrrolidylaldehyde which is readily reduced with aluminum isopropoxide in isopropyl alcohol to the desired pyrrolidyl or alkylpyrrolidyl alkanol.

The reaction of an acid chloride and a pyrrolidyl alkanol can be conveniently carried out by mixing the two substances together in the presence of an inert diluent, such as dry xylene. Reaction usually occurs at ordinary temperatures and can be accelerated and carried substantially to completion by finally refluxing the mixture for about 30 minutes or longer. Upon allowing the reaction mixture to cool, the hydrochloride of the basic ester usually crystallizes and can be separated from most of any inert diluent by filtering. The free ester can be recovered and purified by dissolving the crude hydrochloride in water, extracting the solution with ether, to remove any remaining inert diluent or other water insoluble substances, alkalizing the solution with sodium hydroxide, extracting with ether or other suitable organic liquid, and the extract eventually distilled to volatilize the solvent. The basic esters can be distilled under reduced pressure to obtain a higher degree of purity, if desired.

Acid addition salts of the basic ester, such as, the hydrochloride, hydrobromide, sulfate, phosphate, acetate, succinate, tartrate, benzoate, citrate, lactate, picrate, and other acid addition salts can be prepared readily by allowing the ester to react with the selected acid in a solvent such as alcohol or a mixture of alcohol and ethyl acetate. Upon distillation of the solvent, the salt remains as a residue which can be purified by recrystallization from alcohol, or other suitable solvent. A mixture of ethyl alcohol and ethyl acetate is particularly suitable in most instances. Acid addition salts of certain acids, especially the hydrochloride and citrate have well defined crystalline structures. Certain of the polybasic acids, such as citric acid, combine with the amino esters in equimolar proportions to form the monoamine salts.

The pyrrolidyl alkanols used in preparing the esters of the present invention can be a pyrrolidyl-ethanol, a pyrrolidyl-propanol, a pyrrolidyl-butanol, or a pyrrolidyl-pentanol. The carbon chain of the alkylene group, $-C_nH_{2n}-$, can be either straight or branched. The pyrrolidine ring can be either unsubstituted or it may contain one or more lower alkyl groups. "Lower alkyl" as used in this specification and the appended claims is intended to include aliphatic groups having from one to five carbon atoms, inclusive. Representative groups which may be substituted on the pyrrolyidyl ring, are, for example, methyl, ethyl, propyl, isopropyl, butyl, secondary-butyl, tertiary-butyl, pentyl, isopentyl, et cetera. It is to be understood that I do not limit myself to pyrrolidyl rings containing only one lower-alkyl substituent on a ring carbon atom of the pyrrolidyl ring. The pyrrolidine ring is attached to the alkylene group through the nitrogen atom. Representative pyrrolidyl-alkanols, which, among others, may be used in preparing esters of the invention, include:

2-(2-methylpyrrolidyl-1)-ethanol
2-(3-methylpyrrolidyl-1)-ethanol
2-(2,3-dimethylpyrrolidyl-1)-ethanol
2-(2,4-dimethylpyrrolidyl-1)-ethanol
2-(2,5-dimethylpyrrolidyl-1)-ethanol
2-(3,3-dimethylpyrrolidyl-1)-ethanol
2-(3,4-dimethylpyrrolidyl-1)-ethanol
2-(2,4,4-trimethylpyrrolidyl-1)-ethanol
2-(2-ethylpyrrolidyl-1)-ethanol
2-(pyrrolidyl-1)-ethanol
3-(pyrrolidyl-1)-propanol-1
2-methyl-2-(pyrrolidyl-1)-propanol-1
3-(2-methylpyrrolidyl-1)-propanol-1
2-methyl-3-(pyrrolidyl-1)-propanol-1
2,2-dimethyl-3-(pyrrolidyl-1)-propanol-1
1-(pyrrolidyl-1)-propanol-2
1-(2,4-dimethylpyrrolidyl-1)-propanol-2
1-(2,5-dimethylpyrrolidyl-1)-propanol-2
3-(pyrrolidyl-1)-butanol-1
4-(pyrrolidyl-1)-butanol-1
3-(pyrrolidyl-1)-butanol-2
1-(pyrrolidyl-1)-butanol-3
1-(pyrrolidyl-1)-pentanol-4
1-(3-butylpyrrolidyl-1)-propanol-2
2-(3-isopropylpyrrolidyl-1)-ethanol
2-(3-pentylpyrrolidyl-1)-ethanol
2-(2-methyl-3-pentylpyrrolidyl-1)-ethanol Although the preferred method for preparing the compounds of the invention comprises reacting a para-propoxybenzoyl chloride with a pyrrolidyl-alkanol, it should be pointed out that they can also be prepared in other ways which will be apparent to those skilled in the art. For example, an alkali metal salt of a para-propoxybenzoic acid can be heated with a suitable pyrrolidyl-alkyl halide, preferably in a suitable solvent, such as ethanol, isopropanol, isopropyl ether, butanol, et cetera, and the desired ester thereafter isolated from the reaction mixture.

Free basic esters within the scope of the invention, include, among others:

2-(3-methylpyrrolidyl-1)-ethyl para-n-propoxybenzoate
2-(3-methylpyrrolidyl-1)-ethyl para-isopropoxybenzoate
2-(2,3-dimethylpyrrolidyl-1)-ethyl para-n-propoxybenzoate
2-(2,4-dimethylpyrrolidyl-1)-ethyl para-n-propoxybenzoate
2-(2,4-dimethylpyrrolidyl-1)-ethyl para-isopropoxybenzoate
2-(3,3-dimethylpyrrolidyl-1)-ethyl para-n-propoxybenzoate
2-(3,3-dimethylpyrrolidyl-1)-ethyl para-isopropoxybenzoate
2-(2-ethylpyrrolidyl-1)-ethyl para-n-propoxybenzoate
2-methyl-2-(pyrrolidyl-1)-1-propyl para-n-propoxybenzoate
2,2-dimethyl-3-(pyrrolidyl-1)-1-propyl para-isopropoxybenzoate
2,2-dimethyl-3-(pyrrolidyl-1)-1-propyl para-n-propoxybenzoate
1-(2,4-dimethylpyrrolidyl-1)-2-propyl para-n-propoxybenzoate
3-(pyrrolidyl-1)-2-butyl para-n-propoxybenzoate
1-(pyrrolidyl-1)-3-butyl para-n-propoxybenzoate
1-(pyrrolidyl-1)-4-pentyl para-n-propoxybenzoate The following Preparations and Examples are given to illustrate certain methods by which some of the starting materials and compounds of the present invention may be prepared, but the said Preparations and Examples are not to be construed as limiting.

*Preparation 1.—Ethyl alpha-(pyrrolidyl-1)-propionate*

To a stirred solution of 181 grams of ethyl alphabromopropionate in 200 milliliters of benzene 148 grams of pyrrolidine was added at a substantially uniform rate over a period of 45 minutes. The reaction was quite vigorous causing the solvent to boil. After all of the pyrrolidine had been added, the solution was heated under reflux for an hour, cooled, poured into 400 milliliters of ice-water, acidified with dilute aqueous hydrochloric acid and the two layers which resulted were separated. The aqueous layer was washed with ether, made strongly alkaline with cold aqueous sodium hydroxide, and extracted four times with 200-milliliter portions of ether. The ether extracts were combined, dried, the solvent removed and the residue distilled at a reduced pressure of about 12 millimeters of mercury absolute. There was thus obtained 156.7 grams (91.5 percent of the theoretical yield) of ethyl alpha-(pyrrolidyl-1)-propionate, boiling at 84 degrees centigrade at a pressure of 12 millimeters of mercury absolute.

*Preparation 2.—2-(pyrrolidyl-1)-propanol-1*

To a solution of 7.6 grams of lithium aluminum hydride in 250 milliliters of dry ether, 61.7 grams of ethyl alpha-(pyrrolidyl-1)-propionate was added slowly enough to cause gentle refluxing of the ether. The mixture was then allowed to stand for a few minutes without cooling and 20 milliliters of water added dropwise. The mixture was then cooled to about ten degrees centigrade by adding ice and acidified with aqueous hydrochloric acid. The aqueous layer was separated, washed with ether, and made strongly basic with concentrated sodium hydroxide. The basic solution was then extracted repeatedly with ether, the ethereal extracts combined, dried with anhydrous potassium carbonate, the ether removed, and the residual oil fractionally distilled. There was thus obtained 38.1 grams of 2-(pyrrolidyl-1)-propanol-1, boiling at 80 degrees centigrade at a pressure of 11 millimeters of mercury absolute, and having an index of refraction, $n_D^{25}$, of 1.4758.

Preparation 3

Following substantially the procedure given in Preparations 1 and 2, the following alcohols were prepared:

1. 2-methyl-3-(pyrrolidyl-1)-propanol-1, boiling at 91 degrees centigrade at a pressure of 12 millimeters of mercury absolute; $n_D^{25}=1.4620$.
2. 3-(pyrrolidyl-1)-butanol-1, boiling at 114 degrees centigrade at a pressure of 21 millimeters of mercury absolute; $n_D^{25}=1.4742$.
3. 3-(pyrrolidyl-1)-butanol-2, boiling at 79 degrees centigrade at a pressure of 13 millimeters of mercury absolute; $n_D^{25}=1.4610$.
4. 1-(pyrrolidyl-1)-butanol-3, boiling at 87 degrees centigrade at a pressure of 15 millimeters of mercury absolute; $n_D^{25}=1.4611$.

Preparation 4.—3-(pyrrolidyl-1)-propanol-1

A mixture was prepared consisting of 50.7 grams of sodium hydroxide, 45.7 grams of water, and 60.5 grams of pyrrolidine. The mixture was stirred vigorously and 100 grams of 3-chloropropanol-1 added to the mixture at a rate such that the temperature of the mixture was maintained between about 75 and 100 degrees centigrade. When the addition had been completed, the mixture was stirred for an additional thirty minutes and allowed to stand for several hours. Sufficient solid sodium hydroxide was then added to saturate the mixture and the oily layer which formed separated. The aqueous layer was extracted with benzene, the benzene extract added to the oily layer and the mixture fractionally distilled. There was thus obtained 65.5 grams of 3-(pyrrolidyl-1)-propanol-1, boiling at 115 degrees centigrade at a pressure of 43 millimeters of mercury absolute, and having an index of refraction, $n_D^{25}$, of 1.4701.

Preparation 5.—4-(pyrrolidyl-1)-butanol-1

Following substantially the procedure given in Preparation 4, 4-(pyrrolidyl-1)-butanol-1 was prepared, having a boiling point of 113 degrees centigrate at a pressure of 12 millimeters of mercury absolute; $n_D^{25}=1.4705$.

Preparation 5.—4-(pyrrolidyl-1)-butanol-1 panol-1

A mixture of 44.6 grams of 2-amino-2-methylpropanol-1, 108 grams of tetramethylene dibromide and 200 milliliters of toluene was boiled under reflux for three hours, 84 grams of sodium bicarbonate added and the boiling continued for an additional fifteen minutes. The mixture was then cooled to about 25 degrees centigrade, 80 milliliters of aqueous 50 percent sodium hydroxide added, the organic layer which formed removed, sufficient water added to dissolve the salt and the aqueous solution extracted continuously with ether for nine hours. The ether extract and the organic layer were combined, dried over anhydrous potassium carbonate and distilled. The distillate, melting at 27.5 degrees centigrade, was dissolved in dilute acid and treated with aqueous sodium nitrite to remove any secondary amines. After extracting with ether, the aqueous solution was made basic with aqueous sodium hydroxide and extracted three times with 100-milliliter portions of ether. The ether extracts were combined, dried, the ether removed and the residue distilled at a reduced pressure of about 12 millimeters of mercury absolute. There was thus obtained 54 grams (75.5 percent of the theoretical yield) of 2-methyl-2-(pyrrolidyl-1)-propanol-1, boiling at 87 degrees centigrade at a pressure of 12 millimeters of mercury absolute and having an index of refraction, $n_D^{30}$, of 1.4720.

Preparation 7.—2,2-dimethyl-3-(pyrrolidyl-1)-propionaldehyde

A mixture of 71.1 grams of pyrrolidine, 81 milliliters of concentrated hydrochloric acid, and 81 milliliters of 37 percent formalin was heated to boiling under reflux conditions, 79.3 grams of isobutyraldehyde added at a substantially uniform rate over a period of three-quarters of an hour, boiling under reflux continued for an additional hour, 50 milliliters of 37 percent formalin added, and the mixture refluxed for another hour and a quarter. After standing for three days, the mixture was made strongly basic with 40 percent sodium hydroxide and extracted five times with 100-milliliter portions of ether. The ether extracts were combined, dried over anhydrous potassium carbonate, the solvent removed and the residue fractionally distilled at a reduced pressure of about 32 millimeters of mercury absolute. There was thus obtained 65.7 grams (42.3 percent of the theoretical yield) of 2,2-dimethyl-3-(pyrrolidyl-1)-propionaldehyde, boiling at 97 degrees centigrade at a pressure of 32 millimeters of mercury absolute, and having an index of refraction, $n_D^{25}$, of 1.456.

Preparation 8.—2,2-dimethyl-3-(pyrrolidyl-1)-propanol-1

A mixture of 61.5 grams of 2,2-dimethyl-3-(pyrrolidyl-1)-propionaldehyde and 350 milliliters of isopropanol was removed from 40.8 grams of aluminum isopropoxide by slow distillation through a very efficient column. After six hours of distillation, the distillate gave a negative test for acetone. The dark residue was cooled and 200 milliliters of 10 percent sodium hydroxide added. The organic layer was separated from the aqueous layer, and saturated with aqueous potassium carbonate to form two layers. The aqueous fraction was separated, combined with the aqueous layer obtained previously and extracted six times with 100-milliliter portions of ether. The ether extracts were combined and dried over anhydrous potassium carbonate. The ether was removed and the residue fractionally distilled at a reduced pressure of about 26 millimeters of mercury absolute. There was thus obtained 25.6 grams (41.7 percent of the theoretical yield) of 2,2-dimethyl-3-(pyrrolidyl-1)-propanol-1, boiling at 111 degrees centigrade at a pressure of 26 millimeters of mercury absolute, and having an index of refraction, $n_D^{25}$, of 1.4609.

Preparation 9.—1-(pyrrolidyl-1)-pentanone-4

A solution of 150 grams of 2-(pyrrolidyl-1)-ethyl chloride in 100 milliliters of benzene was added dropwise to a suspension of the sodium enolate of ethyl acetoacetate (obtained from 147 grams of ethyl acetoacetate and 26 grams of metallic sodium) in one liter of boiling benzene and the mixture heated under reflux for ten hours. The mixture was cooled to about 25 degrees centigrade, and a solution of 75 milliliters of concentrated sulfuric acid in 160 milliliters of water and 140 grams of ice was added. The resulting aqueous layer was separated and washed with benzene. The acidic aqueous solution of ethyl alpha [β'-(pyrrolidyl-1)-ethyl]-acetoacetate sulfate was heated under reflux for seventeen hours, cooled to about 20 degrees centigrade, 430 milliliters of cold thirty percent sodium hydroxide solution added, and the resulting oily organic layer was separated. The aqueous layer was extracted three times with 100-milliliter portions of benzene. The organic layer and the benzene extracts were combined, dried, the benzene removed, and the residue distilled at a reduced pressure of about 12 millimeters of mercury absolute. There was thus obtained 129 grams of 1-(pyrrolidyl-1)-pentanone-4, distilling at 92–98 degrees centigrade at a pressure of 11-13 millimeters of mercury absolute. Redistillation gave 98.2 grams of 1-(pyrrolidyl-1)-pentanone-4, $n_D^{25}$, of 1.4589, distilling at 93–95 degrees centigrade at a pressure of 11 millimeters of mercury absolute.

Preparation 10.—1-(pyrrolidyl-1)-pentanol-4

A solution of 65.5 grams of 1-(pyrrolidyl-1)-petanone-4 in 60 milliliters of methanol was hydrogenated at 1100 pounds pressure and 100 degrees centigrade in the presence of five grams of Raney nickel catalyst. The reaction took about three hours to consume nearly the theoretical quantity of hydrogen. After removal of the catalyst and solvent, the residue was distilled under a reduced pressure of about 12 millimeters of mercury absolute. There was thus obtained 57.2 grams (85 percent of the theoretical yield) of 1-(pyrrolidyl-1)-pentanol-4, boiling at 111 degrees centigrade at a pressure of 12 millimeters of mercury absolute, and having an index of refraction, $n_D^{25}$, of 1.4652.

Preparation 11.—1-(2-hydroxyethyl)-5-methyl-pyrrolidone-2

A suspension of 0.2 gram of platinum oxide catalyst in 25 milliliters of absolute ethanol was reduced to platinum, a solution of 34.8 grams of levulinic acid and 37.8 grams of ethanolamine in 75 milliliters of absolute alcohol added, and the mixture hydrogenated, at about 50 pounds pressure and room temperature for about four hours, at which time the theoretical amount of hydrogen had been absorbed. After the catalyst and solvent had been removed, the residue was fractionally distilled. There was thus obtained 42.5 grams (100 percent of the theoretical yield) of 1-(2-hydroxyethyl)-5-methyl-pyrrolidone, boiling at 167 degrees centigrade at a pressure of 12 millimeters of mercury absolute and having an index of refraction, $n_D^{20}$, of 1.4900.

Preparation 12.—2-(2-methylpyrrolidyl-1)-ethanol

By a procedure similar to that described in Preparation 2, fifty-one grams of 1-(2-hydroxyethyl)-5-methyl-2-pyrrolidone was reduced with 18 grams of lithium aluminum hydride in 400 milliliters of ether. Distillation gave 35 grams (76 percent of the theorectical yield) of 2-(2-methyl-pyrrolidyl-1)-ethanol, boiling at 87 degrees centigrade at a pressure of 16 millimeters of mercury absolute, and having an index of refraction, $n_D^{25}$, of 1.4680.

Preparation 13

By a procedure similar to that described in Preparations 11 and 12, the following compounds were prepared:

1. 2-(2,3-dimethylpyrrolidyl-1)-ethanol, boiling at 86 degrees centigrade at a pressure of 13 millimeters of mercury absolute, index of refraction, $n_D^{25}$, of 1.4661.

2. 3-(2-methylpyrrolidyl-1)-propanol-1, boiling at 100 degrees centigrade at a pressure of 18 millimeters of mercury absolute, index of refraction, $n_D^{25}$, of 1.4672.

Preparation 14.—N-(2-hydroxyethyl)-alpha-methylsuccinimide

A mixture of 66 grams of alpha-methyl-succinic acid and 73.4 grams of monoethanolamine was heated by means of an oil bath, the temperature of the mixture gradually rising to 260 degrees centigrade, until distillation ceased. The residue was distilled under a reduced pressure of about one millimeter of mercury absolute to obtain a viscous oil which, upon fractional distillation, yielded 67.8 grams (86.4 percent of the theoretical yield) of N-(2-hydroxyethyl)-alpha-methyl-succinimide, boiling at 102 degrees centigrade at a pressure of 0.01 millimeter of mercury absolute, and having an index of refraction, $n_D^{25}$, of 1.4970.

Preparation 15.—2-(3-methylpyrrolidyl)-ethanol

By a procedure similar to that described in Preparation 2, 62.8 grams of N-(2-hydroxyethyl)-alpha-methylsuccinimide was reduced with 30 grams of lithium aluminum hydride. Upon fractional distillation, there was obtained 35 grams (68.1 percent of the theoretical yield) of 2-(3-methylpyrrolidyl)-ethanol, boiling at 86 degrees centigrade at a pressure of 16 millimeters of mercury absolute, and having a refractive index, $n_D^{25}$, of 1.4680.

Preparation 16

By a procedure similar to that described in Preparations 14 and 15, the following alcohols were prepared:

1. 2-(3,3-dimethylpyrrolidyl-1)-ethanol, boiling at 81 degrees centigrade at a pressure of 13 millimeters of mercury absolute, index of refraction, $n_D^{25}$, of 1.4580.

2. 2-(3,4-dimethylpyrrolidyl-1)-ethanol, boiling at 86 degrees centigrade at a pressure of 12 millimeters of mercury absolute, index of refraction, $n_D^{25}$, of 1.4594.

3. 2-(2,4,4-trimethylpyrrolidyl-1)-ethanol, boiling at 84 degrees centigrade at a pressure of 14 millimeters of mercury absolute, index of refraction, $n_D^{25}$, of 1.4535.

Preparation 17.—para-n-Propoxybenzoyl chloride

A solution of 676.1 grams of para-n-propoxybenzoic acid and 808.6 grams of thionyl chloride in one liter of benzene was boiled under reflux for four hours, concentrated to remove substantially all of the excess thionyl chloride and benzene, and the residue distilled at a reduced pressure of about 12 millimeters of mercury absolute. There was thus obtained 610.7 grams (82 percent of the theoretical yield) of para-n-propoxybenzoyl chloride, boiling at 149–151 degrees centigrade at a pressure of 12 millimeters of mercury absolute.

*Preparation 18.—para-Isopropoxybenzoyl chloride*

Following substantially the procedure given in Preparation 17, 399.2 grams (88.5 percent of the theoretical yield) of para-isopropoxybenzoyl chloride, boiling at 149–151 degrees centigrade at a pressure of 15 millimeters of mercury absolute, was obtained from 397.3 grams of para-isopropoxy-benzoic acid.

*Example 1.—3(pyrrolidyl-1)-1-propyl para-isopropoxybenzoate*

A solution of 18.3 grams of para-isopropoxybenzoyl chloride in 25 milliliters of dry benzene was added at a substantially uniform rate to a boiling solution of 12.9 grams of 3-(pyrrolidyl-1)-propanol-1 in 125 milliliters of benzene. Boiling under reflux was continued for six hours, the mixture was cooled to about 30 degrees centigrade, 100 milliliters of water added and the layers thus formed separated. The aqueous layer was made basic with dilute aqueous sodium hydroxide and extracted three times with 50-milliliter portions of ether. The ether extracts were combined, dried, concentrated to about 50 milliliters, and the residue distilled at a reduced pressure of about one millimeter of mercury absolute. There was thus obtained 21.9 grams of 2-(pyrrolidyl-1)-1-proply para-isopropoxybenzoate, boiling at 161–162 degrees centigrade at a pressure of 0.03 millimeter of mercury absolute, and having an index of refraction, $n_D^{22}$, of 1.5257.

Analysis:
Calculated for $C_{17}H_{25}O_2N$: N, 4.80
Found: 5.00

*Example 2.—2-(pyrrolidyl-1)-1-propyl para-isopropoxybenzoate hydrochloride*

A slight excess of dry hydrogen chloride gas was added to a solution of five grams of 2-(pyrrolidyl-1)-1-propyl para-isopropoxybenzoate in fifty milliliters of ether. An oil separated, the ether was decanted, and the oil crystallized from the methyl ethyl ketone. There was thus obtained 6.2 grams (97 percent of the theoretical yield) of 3-(pyrrolidyl-1)-1-propyl para-isopropoxybenzoate hydrochloride melting at 126–127.5 degrees centigrade.

Analysis:
Calculated for $C_{17}H_{26}O_3NCl$: Cl, 10.8
Found: 10.6

*Example 3.—2-(2-methylpyrrolidyl-1)-ethyl para-n-propoxybenzoate*

A solution of 18.3 grams of para-n-propoxybenzoyl chloride in 25 milliliters of benzene was added at a substantially uniform rate over a period of 30 minutes to a refluxing solution of 18.3 grams of 2-(2-methylpyrrolidyl-1)-ethanol. Boiling under reflux was continued for two and one-half hours, the mixture cooled to about 30 degrees centigrade, fifty milliliters of water added and the layers so-obtained separated. The aqueous layer was made alkaline with dilute aqueous sodium hydroxide and extracted three times with 50-milliliter portions of ether. The ether extracts were combined, dried, concentrated to about 30 milliliters and the residue distilled under a reduced pressure of about one millimeter of mercury absolute. There was thus obtained 23.4 grams (84.1 percent of the theoretical yield) of 2-(2-methyl-pyrrolidyl-1)-ethyl para-n-propoxybenzoate, boiling at 138–139 degrees centigrade at a pressure of 0.03 millimeter of mercury absolute, and having an index of refraction, $n_D^{20}$, of 1.5251.

Analysis:
Calculated for $C_{17}H_{25}O_3N$: N, 4.80
Found: 4.96

*Example 4.—2-(2-methylpyrrolidyl-1)-ethyl para-n-propoxybenzoate hydrochloride*

A solution of five grams of 2-(2-methylpyrrolidyl-1)-ethyl para-n-propoxybenzoate in 50 milliliters of ether was treated with a slight excess of dry hydrogen chloride gas. An oily residue separated, the ether decanted and the oily residue crystallized from ethyl acetate. There was thus obtained 4.7 grams of 2-(2-methylpyrrolidyl-1)-ethyl para-n-propoxybenzoate hydrochloride melting at 144–146 degrees centigrade.

Analysis:
Calculated for $C_{17}H_{26}O_3NCl$: Cl, 10.8
Found: 10.8

*Example 5*

Following substantially the procedure given in Examples 1 and 2, the following esters and their hydrochlorides were prepared:

1. 2-(3-methylpyrrolidyl-1)-ethyl para-isopropoxybenzoate, boiling at 143–144 degrees centigrade at a pressure of 0.05 millimeter of mercury absolute.

Analysis:
Calculated for $C_{17}H_{25}O_3$: N, 4.80
Found: 4.83

The hydrochloride melted at 111–112 degrees centigrade.

Analysis:
Calculated for $C_{17}H_{26}O_3NCl$: Cl, 10.8
Found: 10.7

2. 2-(2-methylpyrrolidyl-1)-ethyl para-n-propoxybenzoate, boiling at 141–142 degrees centigrade at a pressure of 0.05 millimeter of mercury absolute.

Analysis:
Calculated for $C_{17}H_{25}O_3$: N, 4.80
Found: 4.96

The hydrochloride melted at 114–116 degrees centigrade.

Analysis:
Calculated for $C_{17}H_{26}O_3NCl$: Cl, 10.8
Found: 10.7

3. 2-(2-methylpyrrolidyl-1)-ethyl para-iso-propoxybenzoate, boiling at 168–172 degrees centigrade at a pressure of 0.3 millimeter of mercury absolute.

Analysis:
Calculated for $C_{17}H_{25}O_3N$: N, 4.80
Found: 4.80

The hydrochloride melted at 163.5–164.5 degrees centigrade.

Analysis:
Calculated for $C_{17}H_{26}O_3NCl$: Cl, 10.8
Found: 10.8

4. 2-(3,3-dimethylpyrrolidyl-1)-ethyl para-n-propoxybenzoate, boiling at 146 degrees centigrade at a pressure of 0.04 millimeter of mercury absolute.

Analysis:
Calculated for $C_{18}H_{27}O_3N$: N, 4.58
Found: 4.69

The hydrochloride melted at 151–152 degrees centigrade.

Analysis:
Calculated for $C_{18}H_{28}NO_3Cl$: Cl, 10.4
Found: 10.2

5. 2-(3,3-dimethylpyrrolidyl-1)-ethyl para-isopropoxybenzoate, boiling at 141–142 degrees centigrade at a pressure of 0.04 millimeter of mercury absolute.

Analysis:
Calculated for $C_{18}H_{27}NO_3$: N, 4.58
Found: 4.61

The hydrochloride melted at 155–156 degrees centigrade.

Analysis:
Calculated for $C_{18}H_{28}NO_3Cl$: Cl, 10.4
Found: 10.3

6. (2,5-dimethylpyrrolidyl-1)-ethyl para-n-propoxybenzoate, boiling at 126–127 degrees centigrade at a pressure of 0.02 millimeter of mercury absolute.

Analysis:
Calculated for $C_{18}H_{27}NO_3$: N, 4.58
Found: 4.53

The hydrochloride melted at 118–120 degrees centigrade.

Analysis:
Calculated for $C_{18}H_{28}NO_3Cl$: Cl, 10.4
Found: 10.4

7. (2,5-dimethylpyrrolidyl-1)-ethyl para-isopropoxybenzoate, boiling at 127–130 degrees centigrade at a pressure of 0.03 millimeter of mercury absolute.

Analysis:
Calculated for $C_{18}H_{27}NO_3$: N, 4.58
Found: 4.57

The hydrochloride melted at 106–108 degrees centigrade.
Analysis:
Calculated for $C_{18}H_{28}NO_3Cl$: Cl, 10.4
Found: 10.1

8. 2-(pyrrolidyl-1)-1-propyl para-n-propoxybenzoate, boiling at 152–153 degrees centigrade at a pressure of 0.25 millimeter of mercury absolute.

Analysis:
Calculated for $C_{17}H_{25}NO_3$: N, 4.80
Found: 4.72

The hydrochloride melted at 120–121 degrees centigrade.

Analysis:
Calculated for $C_{17}H_{26}NO_3Cl$: Cl, 10.8
Found: 10.7

9. 2-(pyrrolidyl-1)-1-propyl para-isopropoxybenzoate, boiling at 151–152 degrees centigrade at a pressure of 0.2 millimeter of mercury absolute.

Analysis:
Calculated for $C_{17}H_{25}NO_3$: N, 4.80
Found: 4.91

The citrate melted at 109.5–110.5 degrees centigrade.

Analysis:
Calculated for $C_{23}H_{33}NO_{10}$: N, 2.90
Found: 2.93

10. 1-(pyrrolidyl-1)-2-propyl para-n-propoxybenzoate, boiling at 127–130 degrees centigrade at a pressure of 0.03 millimeter of mercury absolute.

Analysis:
Calculated for $C_{17}H_{25}NO_3$: N, 4.80
Found: 4.74

The hydrochloride melted at 150–152 degrees centigrade.

Analysis:
Calculated for $C_{17}H_{26}NO_3Cl$: Cl, 10.8
Found: 10.6

11. 1-(pyrrolidyl-1)-2-propyl para-isopropoxybenzoate, boiling at 152.5–153.5 degrees centigrade at a pressure of 0.15 millimeter of mercury absolute.

Analysis:
Calculated for $C_{17}H_{25}NO_3$: N, 4.80
Found: 4.77

The hydrochloride melted at 147–148 degrees centigrade.

Analysis:
Calculated for $C_{17}H_{26}NO_3Cl$: Cl, 10.8
Found: 10.6

12. 3-(pyrrolidyl-1)-2-butyl para-n-propoxybenzoate, boiling at 135–136 degrees centigrade at a pressure of 0.04 millimeter of mercury absolute.

Analysis:
Calculated for $C_{18}H_{27}NO_3$: N, 4.58
Found: 4.55

The hydrochloride melted at 101–103 degrees centigrade.

Analysis:
Calculated for $C_{18}H_{28}NO_3Cl$: Cl, 10.4
Found: 10.2

13. 3-(pyrrolidyl-1)-2-butyl para-isopropoxybenzoate, boiling at 128–129 degrees centigrade at a pressure of 0.03 millimeter of mercury absolute.

Analysis:
Calculated for $C_{18}H_{27}NO_3$: N, 4.58
Found: 4.58

The hydrochloride melted at 153–154 degrees centigrade.

Analysis:
Calculated for $C_{18}H_{28}NO_3Cl$: Cl, 10.4
Found: 10.1

14. 2-methyl-2-(pyrrolidyl-1)-1-propyl para-n-propoxybenzoate, boiling at 132 degrees centigrade at a pressure of 0.05 millimeter of mercury absolute.

Analysis:
Calculated for $C_{18}H_{27}NO_3$: N, 4.58
Found: 4.61

The hydrochloride melted at 133–134 degrees centigrade.

Analysis:
Calculated for $C_{18}H_{28}NO_3Cl$: Cl, 10.4
Found: 10.3

15. 2-methyl-2-(pyrrolidyl-1)-1-propyl para-isopropoxybenzoate, boiling at 176–178 degrees centigrade at a pressure of 0.9 millimeter of mercury absolute.

Analysis:
 Calculated for $C_{18}H_{27}NO_3$: N, 4.58
 Found: 4.05

The hydrochloride melted at 156–156.5 degrees centigrade.

Analysis:
 Calculated for $C_{18}H_{28}NO_3Cl$: Cl, 10.4
 Found: 10.2

16. 3-(pyrrolidyl-1)-1-propyl para-n-propoxybenzoate, boiling at 132–134 degrees centigrade at a pressure of 0.03 millimeter of mercury absolute.

Analysis:
 Calculated for $C_{17}H_{25}NO_3$: N, 4.80
 Found: 4.89

The hydrochloride melted at 126–126.5 degrees centigrade.

Analysis:
 Calculated for $C_{17}H_{27}NO_3Cl$: Cl, 4.27
 Found: 4.43

17. 3-(pyrrolidyl-1)-1-butyl para-n-propoxybenzoate, boiling at 146–147 degrees centigrade at a pressure of 0.03 millimeter of mercury absolute.

Analysis:
 Calculated for $C_{17}H_{27}NO_3$: N, 4.58
 Found: 4.61

The hydrochloride melted at 84–85 degrees centigrade.

Analysis:
 Calculated for $C_{18}H_{28}NO_3Cl$: Cl, 10.4
 Found: 10.3

18. 3-(pyrrolidyl-1)-1-butyl para-isopropoxybenzoate, boiling at 122–123 degrees centigrade at a pressure of 0.04 millimeter of mercury absolute.

Analysis:
 Calculated for $C_{18}H_{27}NO_3$: N, 4.58
 Found: 4.80

The hydrochloride melted at 106–107 degrees centigrade.

Analysis:
 Calculated for $C_{18}H_{28}NO_3Cl$: Cl, 10.04
 Found: 10.2

19. 2-methyl-3-(pyrrolidyl-1)-1-propyl para-n-propoxybenzoate, boiling at 170–171 degrees centigrade at a pressure of 0.75 millimeter of mercury absolute.

Analysis:
 Calculated for $C_{18}H_{27}NO_3$: N, 4.58
 Found: 4.57

The hydrochloride melted at 147–148 degrees centigrade.

Analysis:
 Calculated for $C_{18}H_{28}NO_3Cl$: Cl, 10.4
 Found: 9.9

20. 2-methyl-3-(pyrrolidyl-1)-1-propyl para-isopropoxybenzoate, boiling at 132–133 degrees centigrade at a pressure of 0.04 millimeter of mercury absolute.

Analysis:
 Calculated for $C_{18}H_{27}NO_3$: N, 4.58
 Found: 4.64

The hydrochloride melted at 177.5–178.5 degrees centigrade.

Analysis:
 Calculated for $C_{18}H_{28}NO_3Cl$: Cl, 10.4
 Found: 10.3

21. 3-(2-methylpyrrolidyl-1)-1-propyl para-n-propoxybenzoate, boiling at 155.5–156.5 degrees centigrade at a pressure of 0.06 millimeter of mercury absolute.

Analysis:
 Calculated for $C_{18}H_{27}NO_3$: N, 4.58
 Found:

The hydrochloride melted at 153–154 degrees centigrade.

Analysis:
 Calculated for $C_{18}H_{28}NO_3Cl$: Cl, 10.4
 Found: 10.3

22. 3-(2-methylpyrrolidyl-1)-1-propyl para-isopropoxybenzoate, boiling at 148–148.5 degrees centigrade at a pressure of 0.04 millimeter of mercury absolute.

Analysis:
 Calculated for $C_{18}H_{27}NO_3$: N, 4.58
 Found:

The hydrochloride melted at 132–133 degrees centigrade.

Analysis:
 Calculated for $C_{18}H_{28}NO_3Cl$: Cl, 10.4
 Found: 10.2

23. 4-(pyrrolidyl-1)-1-butyl para-n-propoxybenzoate (undistillable).

Analysis:
 Calculated for $C_{18}H_{27}NO_3$: N, 4.58
 Found: 4.29

The hydrochloride melted at 110–112 degrees centigrade.

Analysis:
 Calculated for $C_{18}H_{28}NO_3Cl$: Cl, 10.4
 Found: 10.2

24. 4-(pyrrolidyl-1)-1-butyl para-isopropoxybenzoate.

Analysis:
 Calculated for $C_{18}H_{27}NO_3$: N, 4.58
 Found: 4.17

The hydrochloride melted at 120–121 degrees centigrade.

Analysis:
 Calculated for $C_{18}H_{28}NO_3Cl$: Cl, 10.4
 Found: 10.4

Various modifications may be made in the compounds of the present invention without departing from the spirit or scope thereof, and it is to be understood that I limit myself only as defined in the appended claims.

I claim:

1. A member of the group consisting of (a) esters having the formula:

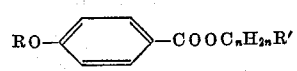

wherein R is a member of the group consisting of the n-propyl and isopropyl radicals, R' is a member of the group consisting of pyrrolidyl-1 and lower-alkyl-substituted pyrrolidyl-1 radicals and n is an integer of the group consisting of 2, 3, 4, and 5, and (b) acid addition salts thereof.

2. Acid addition salts of esters having the formula:

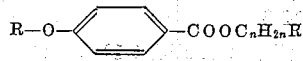

wherein R is n-propyl, $n$ is the integer 2, and R' is a lower-alkyl-substituted pyrrolidyl-1 radical.

3. Acid addition salts of esters having the formula:

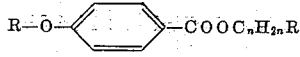

wherein R is n-propyl, $n$ is the integer 2, and R' is a methyl-substituted pyrrolidyl-1 radical.

4. Acid addition salts of esters having the formula:

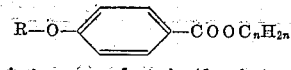

wherein R is n-propyl, $n$ is the integer 3, and R' is pyrrolidyl-1.

5. Acid addition salts of esters having the formula:

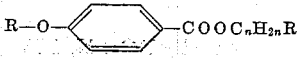

wherein R is isopropyl, $n$ is the integer 4, and R' is pyrrolidyl-1.

6. Acid addition salts of esters having the formula:

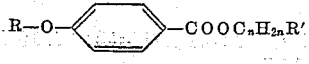

wherein R is n-propyl, $n$ is the integer 4, and R' is pyrrolidyl-1.

7. 3-(pyrrolidyl-1)-propyl para-n-propoxybenzoate hydrochloride.

8. 2-(3-methylpyrrolidyl-1)-ethyl para-n-propoxybenzoate hydrochloride.

9. 2-(pyrrolidyl-1)-1-propyl para-n-propoxybenzoate hydrochloride.

10. 3-(pyrrolidyl-1)-2-butyl para-isopropoxybenzoate hydrochloride.

11. 2-methyl-3-(pyrrolidyl-1)-1-propyl para-n-propoxybenzoate hydrochloride.

WILLIAM BRADLEY REID, Jr.

REFERENCES CITED

The following references are of record in the file of this patent:

UNITED STATES PATENTS

| Number | Name | Date |
| --- | --- | --- |
| 2,081,712 | Rohmann | May 25, 1937 |

OTHER REFERENCES

Blicke et al.: Jour. Amer. Chem. Soc., vol. 53 (March 1931), pp. 1015–1025.

Moore: Jour. Amer. Pharmaceutical Assn., vol. 33 (July 1944), Scientific Edn., pp. 193–204.